United States Patent [19]

Brown

[11] 4,238,886
[45] Dec. 16, 1980

[54] METHOD AND APPARATUS FOR CONTROLLING THE GRINDING OF WORKPIECES

[76] Inventor: Bernard J. Brown, 1307 Russell Road, Ann Arbor, Mich.

[21] Appl. No.: 933,265

[22] Filed: Aug. 14, 1978

Related U.S. Application Data

[62] Division of Ser. No. 794,364, May 6, 1977, Pat. No. 4,139,969.

[51] Int. Cl.³ ............................................... G01B 7/12
[52] U.S. Cl. .................................. 33/149 J; 33/174 Q; 33/178 E; 33/143 L
[58] Field of Search .............. 33/149 J, 143 L, 147 L, 33/147 N, 148 H, 149 R, 172 E, 174 L, 174 Q, 178 R, 178 E; 51/165.77, 165.7, 165.91, 281 R

[56] References Cited

U.S. PATENT DOCUMENTS

| 1,766,546 | 6/1930 | Roos | 33/149 R |
| 3,828,439 | 8/1974 | Ishikawa et al. | 33/178 E |
| 3,962,792 | 6/1976 | Stepánek et al. | 33/143 L |

Primary Examiner—Willis Little
Attorney, Agent, or Firm—Olsen and Stephenson

[57] ABSTRACT

An automatic control for a grinding system is disclosed for controlling the advancement of a grinding wheel into a workpiece to provide a substantially constant time span between the termination of the operation of the feed means which advances the grinding wheel and the attainment of the final size of the workpiece for each workpiece machined. The control generates a reference time span and if the actual time span deviates by more than a preselected time period from the reference time span, the control develops a control signal adjusting the advancement of the grinding wheel during the grinding of the following workpiece.

8 Claims, 8 Drawing Figures

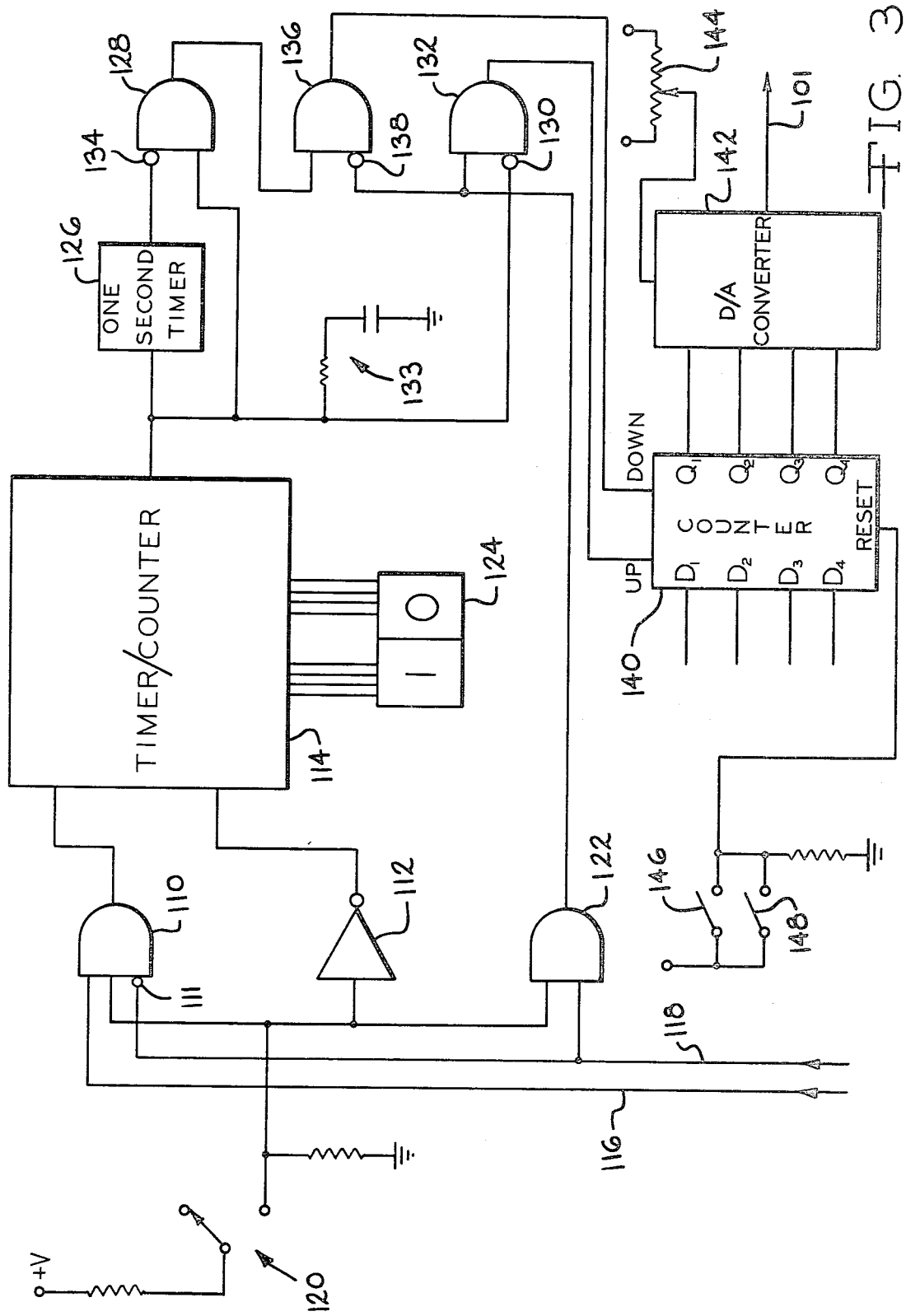

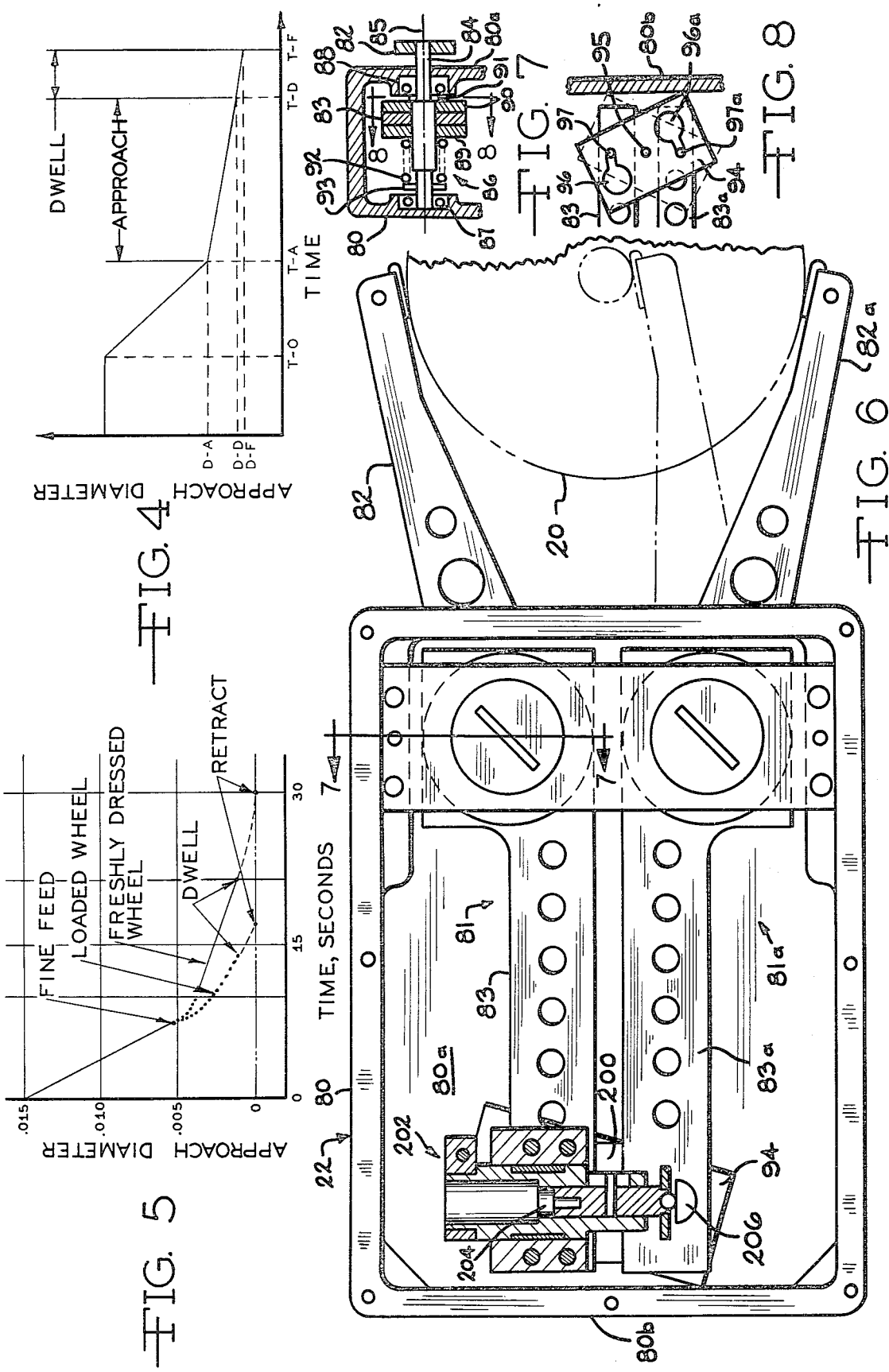

METHOD AND APPARATUS FOR CONTROLLING THE GRINDING OF WORKPIECES

REFERENCE TO RELATED APPLICATION

This application is a division of application Ser. No. 794,364 filed May 6, 1977, now U.S. Pat. No. 4,139,969.

BACKGROUND OF THE INVENTION

The present invention relates generally to grinding control systems, and more particularly, to an automatic feed control system for controlling the feed rate or advancement of the grinding wheel into the workpiece so that the grinding rate of each workpiece is substantially constant as the final state is approached.

In the production grinding of succeeding workpieces, a rotating grinding wheel is initially advanced into a workpiece by feed means at a fast or coarse feed speed, whereby a relatively large amount of material is quickly removed. After the workpiece has been ground to a predetermined size, the rate of feed is reduced to a slower fine feed speed. When the workpiece is slightly larger than its final predetermined size, operation of the feed means is terminated. The grinding wheel, however, continues to advance into the workpiece and remove material as a result of pressure that developed as the grinding wheel and the workpiece were moved together by the feed means. At the precise moment the final size is attained, the grinding wheel is retracted. By terminating the operation or advancement of the feed means at a selected size greater than the final workpiece size, a more accurate workpiece size can be achieved with an improved finish because the grinding wheel approaches final size at a relatively slow rate.

As succeeding workpieces are machined, the grinding wheel becomes dull and loaded and an increasing amount of pressure must be applied against the workpiece by the grinding wheel to remove material. Consequently, when the advancement of the feed means is terminated, the time span to attain final size is continually reduced for each succeeding workpiece as the increased pressure against the workpiece is dissipated. As a result, it is increasingly difficult to retract the grinding wheel at the precise moment that final size is attained. Further, when the grinding wheel is freshly dressed, a reduced amount of pressure is required to machine the workpiece and an excessive time span may exist between the termination of advancement of the feed means and the retraction of the grinding wheel resulting in under-utilization of grinding equipment.

A monitoring system, along with measuring gauges, is used to measure the workpiece during grinding and to control the various workpiece sizes at which the feed rate transitions occur. This type of monitoring system however, does not automatically compensate for the changing surface conditions of the grinding wheel as succeeding workpieces are ground.

SUMMARY OF THE INVENTION

The present invention provides a control system that automatically adjusts the feed of the grinding wheel into the workpiece to compensate for varying surface conditions of the grinding wheel. The feed control system develops a preset reference time span and measures the actual time span between the dwell point or the workpiece size relative to the final size where the advancement of the feed means was stopped and the attainment of final size. If a sufficient deviation between the actual time span and the reference time span occurs, the control system develops a control signal that provides for the adjustment of the advancement of the grinding wheel during the machining of the following workpiece so that the actual time span approaches the reference time span. Consequently, a substantially constant rate of grinding wheel advancement to the final size for each workpiece is achieved. The floating fine feed can control either the workpiece size at which the advancement of the grinding wheel is shifted from a fast or coarse feed to a slow or fine feed, or it can control the workpiece size at which the operation of the feed means is terminated.

It is thus the object of the present invention to provide a control which automatically compensates for varying grinding wheel surface conditions.

DETAILED DESCRIPTION OF THE INVENTION

Further objects, features and advantages of the present invention will become apparent from a consideration of the following description and the accompanying drawing in which:

FIG. 3 is a schematic diagram of a floating feed control of the present invention;

FIGS. 4 and 5 are graphs plotting workpiece size against time;

FIG. 6 is an elevational view showing a gauge for measuring a workpiece;

FIG. 7 is a sectional view of the gauge taken substantially from line 7—7 in FIG. 6; and FIG. 8 is a fragmentary view of the gauge taken substantially from line 8 in FIG. 7.

Figure 1:
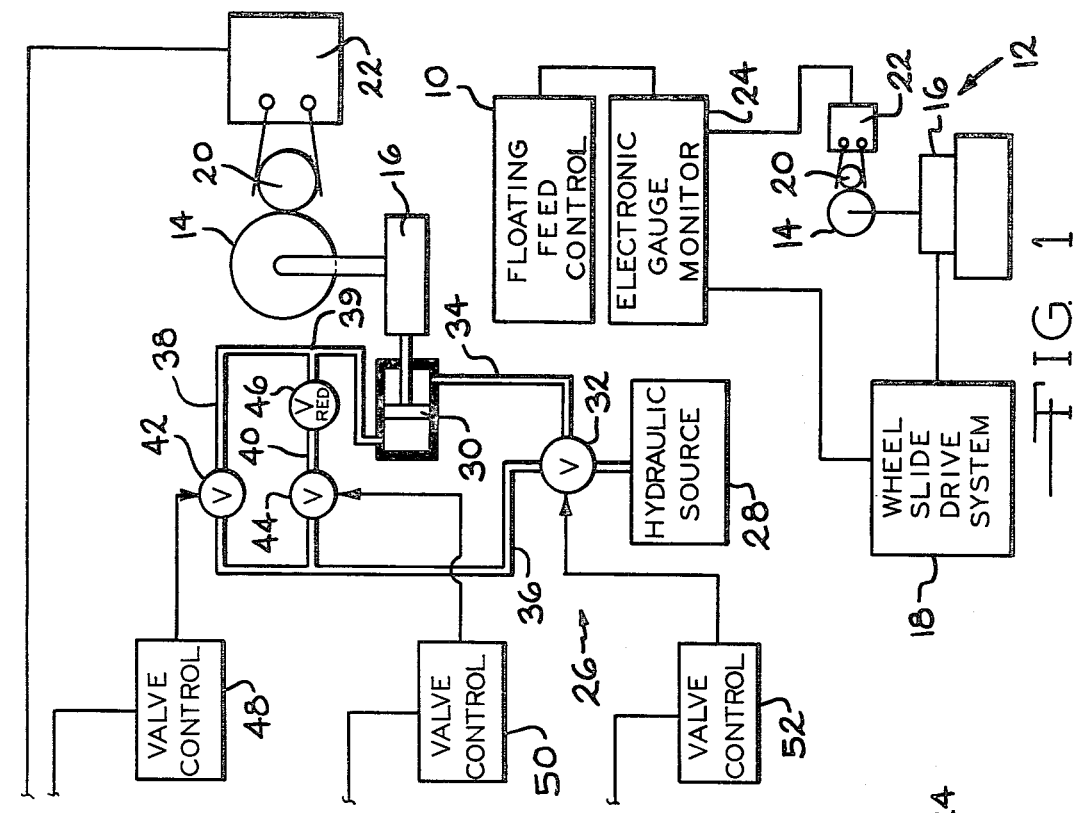
FIG. 1 is a block diagram of a conventional grinding system including the floating feed control of the present invention.

Referring to the drawing, the control system of the present invention, indicated generally at 10 in FIG. 1, is incorporated into a grinding system 12 which includes a grinding wheel 14 and a workpiece 20 that are moved together by a feed means in the form of a wheelslide 16 powered by a wheelslide drive system 18. When the final size has been attained, the drive system 18 moves the grinding wheel 14 and the workpiece 20 apart. The size of the workpiece 20 is measured by a jump on gauge 22 whose output is connected to an electronic gauge monitor 24, which in turn controls the advancement and retraction of the wheelslide 16.

Figure 2:
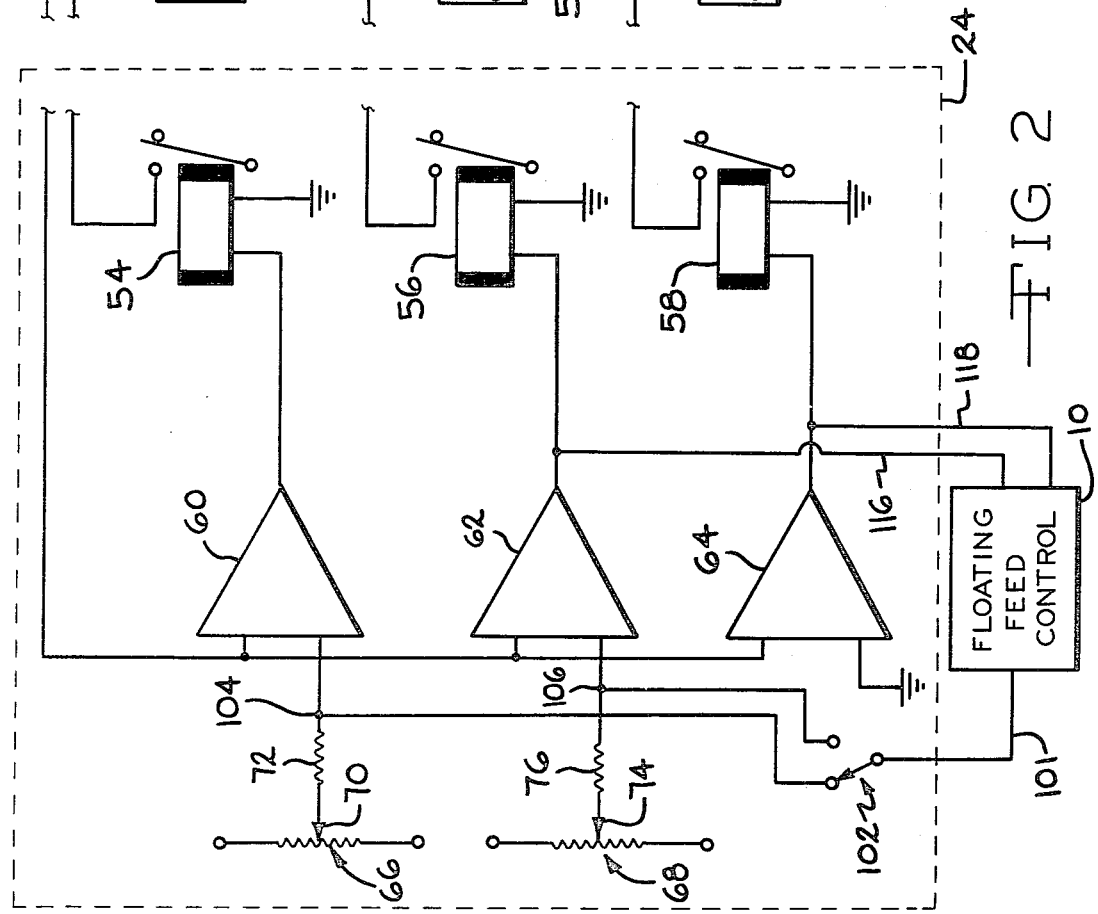
FIG. 2 is a schematic diagram like FIG. 1, showing the gauge monitor and wheelslide drive system in greater detail.

As shown in FIG. 2, the drive system 18 comprises a hydraulic system 26 for moving the wheelslide 16 back and forth to advance and retract the grinding wheel 14. A hydraulic source 28 supplies pressurized fluid to drive a piston 30 to move the wheelslide 16 and the grinding wheel 14 back and forth. A directional control valve 32 controls the flow of the fluid so that when line 34 is open the piston 30 is retracted and when line 36 is open the piston 30 is advanced. Line 36 branches into lines 38 and 40 through which the flow of fluid is controlled by valves 42 and 44. A reducer valve 46 is provided in line 40 to restrict the flow of fluid therethrough. The lines 40 and 38 are joined at a junction 39 before being connected to the piston 30. Valve controls 48, 50, and 52 control the opening and closing of the valves 42,44, and 32 respectively. In turn, the valve controls 48, 50, and 52 are each actuated by relays 54, 56, and 58. The movement of the grinding wheel 14 and the workpiece 20 toward each other occurs in stages. In the first stage, the closing movement speed proceeds at a first rate until a predetermined workpiece size is attained. The monitor 24 there provides for a change of speed to a slower fine feed in a second stage until a selected workpiece size is attained. When the selected size is attained, the advancement of the wheelslide 16 is terminated and the grinding wheel 14 will be retracted when the final size is attained. With valve 32 opened to allow fluid to flow through line 36, the piston 30 advances the wheelslide 16 at a fast, coarse feed rate when both valves 42 and 44 are opened. When valve 42 is closed, a slower fine feed rate or speed occurs since only restricted fluid flow through line 40 advances the piston 30. The forward advancement of the wheelslide 16 is terminated when valves 42 and 44 are both closed at the selected workpiece size greater than the final size of the workpiece. Grinding continues, however, as pressure that developed between the grinding wheel and the workpiece 20 during the advancement of the grinding wheel and the workpiece 20 is dissipated. The wheelslide 16 is retracted when valve 32 closes line 36 and opens line 34 when the final size has been attained.

The gauge 22 is connected to the gauge monitor 24 to control the advancement and retraction of the grinding wheel 14. The gauge 22 develops a voltage that is commensurate with the size of the workpiece 20, and in the illustrated embodiment, the voltage decreases in accordance with a decrease in the size of the workpiece.

The gauge 22, illustrated in FIGS. 6–8, comprises an outer casing 80 supporting a pair of caliper assemblies 81 and 81a that are positioned in substantially vertical alignment. Only the caliper assembly 81 will be described as its construction is identical to the construction of the assembly 81a. Any differences relating to the positioning and arrangement of the assembly 81a will be indicated.

The caliper assembly 81 comprises a first arm 82, a second arm 83, transmission means in the form of a shaft 84 having a longitudinal axis 85 and connecting the arms 82 and 83, and a clutch assembly 86 providing for concomitant movement of the arms 82 and 83. The clutch assembly 86 also enables relative movement between the arms 82 and 83 as will be explained below. The shaft 84 is rotatably supported in the casing 80 by a pair of bearings 87 and 88. The arm 82 is fixedly secured in a suitable manner to the shaft 84 outside the casing 80 and the arm 83 is rotatably mounted on the shaft 84 inside the casing 80. The clutch assembly 86 includes a pair of generally opposed arm engaging plate members 89 and 90 positioned on opposite sides of and in engagement with the second arm 82. The plate 90 abuts a flange extension 91 formed on the shaft 82 to preclude rightward axial movement of the arm 83 as viewed in FIG. 7. A spring 92, engaged at one end to a rim extension 93 formed on the shaft 84 and at the other end to the plate 89 urges the plate 89 into frictional engagement with the arm 83 to bias the arm 83 against the plate 90.

Holding means, such as a rectangular plate 94 is rotatably mounted by the pin 95 on the back wall 80a of the casing 80 near the sidewall 80b and is pivotally movable between a first position engaged with and maintaining the second arms 83 and 83a in relative fixed positions and a second position disengaged from the arms 83 and 83a enabling relative movement therebetween. The plate 94 is provided with locking means comprising a pair of spaced apart opposed openings 96 and 96a, each having an enlarged and a reduced portion. Pin members 97 and 97a extend outwardly from the arms 83 and 83a, respectively. The plate 94 is mounted so that the pins 97 and 97a are positioned in the openings 96 and 96a, respectively. When the plate member 94 is rotated counter clockwise to the first position shown on FIG. 8, its lower corner abuts the wall 80b and the pins 97 and 97a are positioned in the reduced portions of the openings 96 and 96a thereby locking the arms 83 and 83a in relatively fixed positions. When rotated clockwise to the position shown in broken lines in FIG. 8, the upper corner of the plate 94 abuts the wall 80b and the pin members 97 and 97a are free to move within the enlarged portions of the openings 96 and 96a enabling relative movement between the arms 83 and 83a. When the arms 83 and 83a are locked by positioning the plate 94 in its first position, the arms 82 and 82a can be adjustably moved relative to the arms 83 and 83a through the clutch assemblies 86 and 86a.

A spring 200 is connected to and urges the arms 83 and 83a outwardly thereby biasing the arms 82 and 82a inwardly against the workpiece 20. Measuring means in the form of a linear voltage transformer 202 having a movable core 204 is secured to the arm 83. The core 204 is biased such as by gravity toward and is engaged with a platform member 206 extending outwardly from the arm 83a. The transformer 202 produces a voltage, the value of which varies in accordance with the position of the core 204 relative to the body of the transformer 202. With the arms 82 and 82a engaged with the workpiece 20 the voltage developed represents a reference voltage. As material is removed, the arms 82 and 82a are moved inwardly and the core 204 is moved downwardly causing a different voltage to be produced. Consequently, the voltage changes represent changes in the size of the workpiece 20. As will be explained further, the voltage output of the gauge 22 is transmitted to the monitor 24 to control the grinding of the workpiece 20.

If a workpiece 20 of a different size is to be measured, the plate 94 is rotated counter clockwise to the first position to lock the arms 83 and 83a. The clutch assemblies 86 and 86a enable the arms 82 and 82a to be moved to a different position to engage the workpiece as the arms 83 and 83a are maintained in relatively fixed positions. After the arms 82 and 82a are positioned to engage the workpiece, the plate 94 is rotated to the second position enabling relative movement between the arms 83 and 83a.

The gauge monitor 24 is connected to the wheelslide drive system 18 and comprises comparators 60, 62, and 64. The comparator 60 is an approach comparator which develops an output that provides for the shifting or changing of the feed rate from a coarse feed to a fine feed when the size of the workpiece 20 has been reduced to a predetermined size greater than the selected size at which the advancement of the wheelslide 16 is terminated. The comparator 62 is a dwell comparator and develops an output which closes valve 44 to terminate the advancement of the wheelslide 16 when the workpiece 20 has been machined to the selected size greater than the final size. The comparator 64 is a retract comparator which develops an output to retract the grinding wheel 14 when final workpiece size has been attained. The voltage output from the gauge 22 is applied as one input to each comparator 60–64 of the monitor 24. The other input to comparators 60 and 62 is developed by potentiometers 66 and 68, respectively. The other input to the comparator 64 is connected to ground so that an output is developed by the comparator 64 when the size voltage is also at ground. The potentiometer 66 has its wiper contact 70 connected through resistor 72 to the comparator 60 and the potentiometer 62 has its wiper contact 74 connected through a resistor 76 to the comparator 62. Thus, the reference voltage applied to the comparators 60 and 62 can be varied by a selective positioning of the wiper blades 70 and 74. The comparators 60 and 62 will thus produce an output when the size voltage generated by the gauge 22 is equal to or lower than the reference voltage applied to the particular comparator. Whenever one of the comparators 60-64 is producing an output, its associated relay 54, 56, or 58 is actuated to control one of the valve controls 48-52 to close valves 42 and 44 and operate valve 32 to retract the wheelslide 16.

A graphical representation of a desired machining cycle is shown in FIG. 4 where time vs. workpiece size is plotted. At time T-O, the grinding wheel 14 is engaged with the workpiece 20 with a coarse feed rate and material is quickly removed until the size of the workpiece is reduced to size D-A at time T-A. At this workpiece size the feed rate is reduced to a slower fine feed until the size of the workpiece reaches D—D at time T-D where the advancement of the wheelslide 16 is terminated. The grinding wheel 14 continues to advance and grinding continues, however, as the pressure generated during the movement of the grinding wheel 14 and the workpiece 20 toward each other is dissipated, until final size D-F is attained at time T-F, at which time the grinding wheel 14 is retracted. FIG. 5 illustrates the machining characteristics of a freshly dressed wheel and a dull, loaded wheel. When the grinding wheel 14 is dull and loaded, as a result of grinding succeeding workpieces, a greater pressure between the wheel 14 and the workpiece 20 is produced than with a freshly dressed wheel. As can be seen, the time span between dwell, the selected workpiece size at which the advancement of the wheelslide 16 is terminated, and retract is significantly shorter than with the freshly dressed wheel so that retraction of the grinding wheel 14 at the precise moment that final size is attained is difficult. On the other hand, the time span between dwell and retract for a freshly dressed wheel may be longer than is necessary to achieve an accurately machined workpiece. Thus, there is a desired time span between dwell and retract whereby an accurately machined workpiece can be achieved.

The floating feed control 10 functions to adjust either the predetermined workpiece size relative to the final workpiece size at which the coarse feed rate is shifted to a fine feed rate, or to adjust the selected workpiece size at which advancement of the wheelslide 16 is terminated. When the predetermined size is adjusted relative to the final size of the workpiece 20, the time span between the dwell position or workpiece size at which the advancement of the wheelslide 16 is terminated and the attainment of final size or the retract position is commensurately affected. That is, shifting to a fine feed a greater distance away from the final workpiece size increases the time span between the dwell position and the attainment of the final workpiece size. Shifting from the coarse feed to the fine feed at a position closer to the final workpiece size decreses the time span between the dwell position and the attainment of the final workpiece size. Alternatively, the dwell position, or the termination of the wheelslide advancement can be directly adjusted relative to the final workpiece size to control the time span between the dwell position and the attainment of final workpiece size. The floating feed control 10 in the illustrated embodiment senses the machining time of the workpiece 20 and adjusts the movement of the grinding wheel 14 and the following workpiece 20 to provide a substantially constant time span between the termination of the wheelslide 16 advancement and the attainment of the final size for each workpiece machined.

The dwell comparator 62 and the retract comparator 64 have their outputs connected to the floating feed control 10 through lines 116 and 118, respectively, to provide signals indicating the start and the end of the actual time span between the dwell position and retract position. As used herein, the dwell position refers to the selected workpiece size greater than the final size at which the operation of the feed means is terminated. In the preferred embodiment, the termination of the operation of the feed means occurs when the wheelslide advancement is terminated. The floating feed control 10 has its output connected through a line 101 and a switch 102 to a junction 104 between the resistor 72 and the comparator 60. Alternatively, the floating feed control 10 can be connected through switch 102 to a junction 106 between the resistor 76 and the dwell comparator 62.

With respect to the control of the predetermined workpiece size at which the coarse feed is changed to a fine feed, the feed control 10 includes regulating means for applying a predetermined current level to the junction 104. Variations in this current level varies the reference voltage applied to the approach comparator 60 for a given preset position of the wiper 70. If a higher current level is applied at junction 104, the reference voltage is increased causing the comparator 60 to develop an output that shifts the feed rate from a coarse to fine feed at a higher size voltage for the following workpiece 20; that is, at a greater distance away from the final workpiece size. If a lower current level is applied at junction 104, the reference voltage is decreased and the comparator 60 will develop an output changing the coarse to a fine feed at a lower size voltage for the following workpiece 20, that is, at a closer position to final workpiece size. Consequently, a constant time span between the dwell position and the retract position can be achieved to compensate for changing surface conditions of the grinding wheel 14.

When the output of the floating feed control 10 is connected through switch 102 to the junction 106, the reference voltage that is applied to the dwell comparator 62 can be varied in the same manner as the reference voltage applied to the approach comparator 60. In this form of the invention, however, the dwell position relative to the final size of the workpiece 20 is adjusted, if necessary, for the following workpiece to provide a substantially constant time span between the dwell position and the attainment of the final size.

A preferred embodiment of the feed control 10 is illustrated in FIG. 3 and develops a preset reference time span and measures the actual time span between the dwell and the retract positions on the workpiece 20. If the actual time span deviates by a predetermined value from the reference time span, an adjustment in the feed rate for the succeeding workpiece is provided. The feed control 10 includes an AND gate 110 and an inverter 112 that are connected to a timer/counter 114. A logic high output level from the AND gate 110 activates the timer/counter 114 and a logic high output from the inverter 112 serves to reset the timer/counter 114. The AND gate 110 has one input connected by the line 116 from 114. The AND gate 110 has one input connected by the line 116 from the dwell comparator 62, another input connected by an inverter 111 and line 118 from the output of the retract comparator 64, and a third input connected from a gauge enable function in the form of a normally opened switch 120 so that when the switch 120 is closed, a high level output is applied to the AND gate 110. The gauge enable switch 120 can be manually operated, or it can be operatively associated with the gauge 22 so that the switch 120 is closed whenever a workpiece 20 is being measured by the gauge 22. The output of the gauge enable switch 120 also forms an input to an AND gate 122. The other input of the AND gate 122 is connected by line 118 from the output of the retract comparator 64.

The timer/counter 144 is a conventional device which generates a logic high signal after a predetermined number of counts have been counted. A thumbwheel switch 124 is connected to the timer/counter 114 and in response to operator manipulation the count setting in the timer/counter 114 can be controlled. Thus, the timer/counter 114 produces a reference time span that can be varied to accommodate the particular machining conditions.

The output of the timer/counter 114 is applied to a timer 126 which develops a logic high level output signal for a predetermined length of time after it has received a logic high level signal from the timer/counter 114. In this illustrated embodiment, the timer 126 comprises a one-second timer which develops a logic high level output for one second after it has received a logic high signal from the timer/counter 114. The output of the timer/counter 114 is also applied to an AND gate 128 and through an inverter 130 to an AND gate 132. A resistor and capacitor network 133 is connected to the output of the timer/counter 114 to suppress any undesirable signal spikes. The one-second timer 126 has its output connected to an inverter 134 to the AND gate 128 which in turn has its output connected to an AND gate 136. The AND gate 122 is connected to the AND gate 132 and to the AND gate 136 through an inverter 138. The AND gate 122 functions to produce a high logic level output when the final size of the workpiece has been attained and the gauge enable switch 120 is closed.

The AND gates 132 and 136 are connected to an up/down counter 140 which is a conventional storage device for storing counts generated by the AND gates 132 and 136. The AND gate 132 causes the counter 140 to count up and the AND gate 136 causes the counter to count down. The counter 140 is connected to a conventional digital to analog converter 142 which develops a current output commensurate with the count in the up/down counter 140. The initial current output level can be preset and adjusted by selective adjustment of a potentiometer 144. The output of the digital to analog converter 142 is applied through the line 101 and switch 102 to either the junction 104 or the junction 106. The digital to analog converter 104 develops a distinct current level for each count entered into the counter 140. A preset code is entered into the counter 140, and if an up count is entered, the digital to analog converter 142 develops an increased current level. Similarly, if a down count is entered into the counter 140, the digital to analog converter 142 develops a decreased current level commensurate with the lowered count in the counter 140. In the disclosed embodiment, each count ultimately results in a change of about 0.005 inches for the predetermined or selected workpiece size at which the feed transition occurs. As previously explained, a change in the current level in line 101 changes the reference voltage that is applied to the comparator 60, for example, changing the position at which the grinding wheel advancement shifts from a coarse to a fine feed when the succeeding workpiece is machined.

A normally opened on/off switch 146 connects a voltage source to the counter 140 and a normally opened dress wheel switch 148 connects the voltage source to the counter 140. When the feed control 10 is turned off by switch 148, the counter 140 is reset to its initial state. Similarly, whenever the grinding wheel 14 is dressed, the switch 148 is closed resetting the counter 140 to its initial state. In response to a resetting of the counter 140, the digital to analog converter 142 develops a current level commensurate with the initial count entered into the counter 140.

The feed control 10 thus develops a preset reference time span by means of the timer/counter 114 and if the actual time span between the dwell position and the retract position of the grinding wheel 14 deviates by a predetermined value from the reference time span, an adjustment in the advancement of the wheelslide 16 for the machining of the following workpiece 20 is provided.

Assume that a workpiece 20 is being ground to its final size. As the size of the workpiece 20 decreases, the gauge 22 generates a decreasing voltage that is applied to the comparators 60-64. When this voltage equals the reference voltage applied to the approach comparator 60, the comparator 60 generates a signal activating the relay 54 to close the valve 42 thus shifting the feed of the wheelslide 16 from a coarse to a slower fine feed. When the voltage from the gauge 22 is decreased to equal the reference voltage applied to the dwell comparator 62, the relay 56 is activated providing for the closing of the valve 44 to terminate advancement of the wheelslide 16. Grinding continues, however, and when the voltage from the gauge 22 drops to ground, the retract comparator 64 generates a signal activating the relay 58 to provide for the activation of valve 32 to retract the grinding wheel 14.

For purposes of illustration, assume that the thumbwheel switch 124 is set so that the timer/counter 114 generates a logic high level output six seconds after it has been actuated by a logic high level output from the AND gate 110. When a workpiece 20 is placed in its machining position, the gauge enable switch 120 is closed providing a high output signal to the AND gates 110 and 122 and to the inverter 112. Grinding begins and when the size of the workpiece 20 has been reduced to activate the dwell comparator 62, a logic high level signal is applied to the AND gate 110 through line 116. Since line 118 carries a logic low level signal which is inverted by the inverter 111, all of the inputs to the AND gate 110 are at a logic high level to activate the timer/counter 114. When the final size of the workpiece 20 is attained, a logic high level signal is applied to the AND gate 122 through the line 118 from the retract comparator 64. Thus, the AND gate 122 generates a logic high level indicating that the final size has been attained and the AND gate 110 terminates its logic high level output.

After the timer/counter 114 has been activated for six seconds by the AND gate 110, it generates a logic high level output which is applied to the one-second timer 126, the AND gate 128 and to the AND gate 132 through the inverter 130. If the final size of the workpiece 20 is attained before the timer/counter 114 times out, indicating that the surface of the grinding wheel 14 is becoming dull, the AND gate 132 has both of its inputs at a logic high level and generates a logic high level output causing the counter 140 to count up one count. In other words, the actual time span between the position on the workpiece where the advancement of the wheelslide 16 was terminated and the attainment of the final size was less than the reference time span by more than one second. The current output level of the digital to analog converter 142 is increased so that the reference voltage applied to the junction 104 is increased. When the following workpiece 20 is machined, the feed rate will shift from a coarse to a fine feed rate about 0.005 of an inch farther from final size to increase the actual time span between the dwell and retract positions.

If the final size of the workpiece 20 is attained during the one second that the line 126 develops a logic high output, AND gates 128, 132, and 136 will continue to develop a logic low output level since in no instance is there a logic high level input on both inputs of the AND gates 128, 132, and 136. This will occur when the actual time span between the dwell and retract positions approximates the reference time span. Therefore, no adjustment in the feed rate for the machining of the following workpiece 20 is provided.

If the final size of the workpiece 20 has not been attained within one second after the timer/counter 114 develops a logic high output, the AND gate 128 will have both of its inputs at a logic high level and will develop a logic high level output that is applied to the AND gate 136. Since both inputs of the AND gate 136 are at a logic high level, the gate 136 will generate a logic high level output providing a down count in the counter 140. This indicates that the actual time span between the dwell and the retract positions was excessive. The digital to analog converter 142 in this instance functions as a current sink resulting in a lower reference voltage being applied to the approach comparator 60. Consequently, when the following workpiece 20 is machined, the feed rate will be adjusted so that the shift from a coarse feed to a fine feed occurs 0.005 of an inch closer to the final workpiece size. This adjustment of the shift point closer to the final workpiece size results in a decreased actual time span between the dwell and the retract positions for the succeeding workpiece 20. Upon completion of the machining of one workpiece 20, the gauge enable switch is opened causing the inverter 112 to apply a reset signal to the timer/counter 114.

As indicated above, the digital to analog converter 142 can be connected through the line 101, and the switch 102 to the junction 106. This embodiment provides for control of the selected workpiece size at which the advancement of the wheelslide 16 is terminated to directly control the actual time span between the termination of wheelslide 16 advancement and the attainment of the final workpiece size.

In the illustrated embodiment described above, the time span between the dwell and retract positions is measured and compared with a preselected reference time span. It is, however, within the purview of this invention that the time can be measured between the fine feed position and the dwell position and compared to a pre-selected reference time span. The time for machining between these sizes also varies with the surface condition of the grinding wheel. If this measured time deviates from the reference time, the feed control 10 provides for the adjustment of the subsequent workpiece so that a predetermined machining rate can be provided as the final size of the workpiece is approached. Accordingly, precisely sized workpieces can be consistently machined in spite of the changing surface condition of the grinding wheel 14.

In summary, the floating feed control 10 provides a desired machining rate for each workpiece as its final size is approached to compensate for the changing surface conditions of the grinding wheel 14 as successive workpieces are machined. To accomplish this objective, the floating feed control 10 measures the elapsed time between two selected workpiece sizes as a workpiece is being machined. This measured time is then compared with a reference time which has been empirically determined from machining experience with the particular type and size of the workpiece and which is set in the feed control 10. If the measured time deviates from the reference time by a predetermined amount indicating a change in the surface conditions of the grinding wheel 14, the feed control 10 provides for an adjustment of the machining of the subsequent workpiece. That is, either the workpiece size at which the coarse or fast feed is changed to fine or slow feed is adjusted or the workpiece size at which the feed is terminated is adjusted to achieve a measured time between the selected workpiece sizes that corresponds to the reference time. The time for machining the workpiece can be measured between the workpiece size at which the rate of feed is changed from a fast or coarse speed to a slow or fine speed and the workpiece size at which the feed is terminated and compared to a preselected reference time. Similarly, the time for machining the workpiece can be measured between the workpiece size at which the feed is terminated and the final workpiece size at which the grinding wheel 14 is retracted and compared to a pre-selected reference time.

A preferred embodiment of the invention has been disclosed. The invention, however, is not to be limited to the specific structure shown, but rather is to be limited by the following claims.

What is claimed is:

1. A gauge for measuring a workpiece comprising a frame, a pair of caliper assemblies movably mounted on said frame for engaging the surface of a workpiece, means for measuring the relative movement between said caliper assemblies to provide a measurement of the size of said workpiece, at least one of said caliper assemblies including a first arm pivotally mounted for engaging a workpiece, a second arm pivotally mounted for movement within a predetermined range of movement, means interconnecting said first and second arms enabling relative pivotal movement therebetween, and means intermediate said first and second arms at their pivotal connection for releasably maintaining said first and second arms in relatively fixed adjusted positions during the measuring of a workpiece so that the pivotal movement of said first arm is transmitted to said second arm, said releasable maintaining means being operable to enable an initial adjustng movement of said first arm relative to said second arm to a plurality of positions to accommodate a variety of initial sizes of workpieces so that when said first arm is in any of said plurality of positions said second arm remains movable with said predetermined range in response to a measuring movement of said first arm as a selected workpiece is being measured.

2. The gauge according to claim 1, wherein said releasable maintaining means comprises frictional holding means maintaining said arms in said adjusted positions, said frictional holding means being operable to enable relative movement between said arms when the frictional resistance therebetween is overcome.

3. The gauge according to claim 2, wherein said frictional holding means comprises a clutch assembly operable to maintain said first and second arms in relatively fixed positions during the measuring of a workpiece.

4. The gauge according to claim 1, wherein each of said caliper assemblies includes said first and second arms, said means interconnecting said first and second arms, and said releasable maintaining means, said caliper assemblies being arranged with the pivot axes of said arms in a general parallel relationship so the said first arms are pivotally movable toward and away from each other and said second arms are pivotally movable toward and away from each other.

5. A gauge for measuring a workpiece comprising a pair of caliper assemblies, each of said assemblies having a first arm movable into engagement with said workpiece, means urging said first arm into engagement with said workpiece, a second arm, a shaft having a longitudinal axis and connecting said first and second arms, means fixedly securing said first arm to said shaft and means securing said second arm to said shaft for rotation about said axis, a clutch assembly engageable with said second arm and operatively associated with said shaft providing for concomitant movement of said arms and further providing for relative movement between said arms, measuring means engaged with the second arm of each of said assemblies providing measurement readings of said workpiece in response to relative movement between said second arms, and holding means engageable with said second arms and movable between a first position engaged with said second arms maintaining said second arms in relatively fixed positions thereby enabling movement of said first arms relative to said second arms and a second position disengaged from said second arms enabling relative movement between said second arms in response to relative movement between said first arms.

6. The gauge according to claim 5 wherein said clutch assembly comprises an arm engaging member and means operatively associated with said shaft urging said member into engagement with said second arm.

7. The gauge according to claim 6 wherein said holding means comprises a plate member having locking means engageable with said second arms operable to engage and maintain said second arms in said relatively fixed positions in said second position of said plate member.

8. The gauge according to claim 7 further including a first pin member extending outwardly from one of said second arms and a second pin member extending outwardly from the other of second arms, and wherein said locking means comprises a pair of pin receiving openings, each opening having a reduced portion maintaining the corresponding pin member in a fixed position in said first position of said plate member and an enlarged portion enabling movement of the corresponding pin member therein in said second position of said plate member.

* * * * *